United States Patent
Yaguchi (10) Patent No.: US 10,291,119 B2
(45) Date of Patent: May 14, 2019

(54) CONTROL CIRCUIT FOR SWITCHING POWER SUPPLY

(71) Applicant: Fuji Electric Co., Ltd., Kanagawa (JP)

(72) Inventor: Yukihiro Yaguchi, Nagano (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 0 days.

(21) Appl. No.: 15/974,335

(22) Filed: May 8, 2018

(65) Prior Publication Data

US 2019/0006944 A1    Jan. 3, 2019

(30) Foreign Application Priority Data

Jun. 29, 2017    (JP) .................................. 2017-128132

(51) Int. Cl.
*H02M 3/157*    (2006.01)
*H02M 1/08*     (2006.01)
*H02M 1/32*     (2007.01)

(52) U.S. Cl.
CPC ............. *H02M 3/157* (2013.01); *H02M 1/08* (2013.01); *H02M 1/32* (2013.01)

(58) Field of Classification Search
CPC ........... H02M 1/32; H02M 1/08; H02M 3/157
See application file for complete search history.

(56) References Cited

U.S. PATENT DOCUMENTS

| 7,116,090 | B1* | 10/2006 | Yang .................... | H02M 1/4225 323/288 |
| 8,379,419 | B2* | 2/2013 | Yabuzaki ................ | H02M 1/32 323/901 |
| 9,608,508 | B2* | 3/2017 | Darshan .................. | H02M 1/32 |
| 9,985,527 | B2* | 5/2018 | Yaguchi .................. | H02M 1/32 |
| 2010/0315841 | A1* | 12/2010 | Saji .................... | H02M 3/33507 363/21.12 |
| 2016/0181942 | A1* | 6/2016 | Sugawara ............. | H02M 3/156 363/126 |

FOREIGN PATENT DOCUMENTS

JP    2001-66340 A    3/2001

* cited by examiner

*Primary Examiner* — Kyle J Moody
(74) *Attorney, Agent, or Firm* — Chen Yoshimura LLP (57) ABSTRACT

A control circuit for a switching power includes a driver unit that receives an error signal outputted from an error amplifier and generates driving pulses to be applied to a power semiconductor switching device on the basis of the error signal; a short-circuit detection circuit that determines whether a short-circuit occurs between a feedback terminal and a comp terminal of the control circuit; a holding circuit that holds the error signal; and a switching circuit, wherein when the short-circuit detection circuit determines that the short-circuit occurs, the switching circuit provides an error signal held by the holding circuit prior to the detection of the short-circuit to the driver unit instead of the error signal outputted from the error amplifier so that the driver unit does not generate the driving pluses based on the error signal outputted from the error amplifier when the short-circuit is determined to have occurred.

9 Claims, 3 Drawing Sheets

CONTROL CIRCUIT FOR SWITCHING POWER SUPPLY

BACKGROUND OF THE INVENTION

Technical Field

The present invention relates to a control circuit for a switching power supply, and more particularly to a control circuit constituted by a semiconductor integrated circuit.

Background Art

In switching power supplies, output voltage is monitored and the associated results are fed back into the system in order to adjust the output voltage obtained from switching. This type of feedback control reduces fluctuations in the output voltage of the switching power supply. Therefore, it is critical to stabilize the operation of the control circuit implementing this feedback control so as to achieve reliable feedback control operation.

One cause of instability in the feedback control operation of a control circuit is short-circuits between terminals of the control circuit. A control circuit is typically constituted by a semiconductor integrated circuit; however, due to limitations in layout efficiency, chip size, and package size of semiconductor integrated circuits, the distance between adjacent terminals is small, and it is difficult to completely avoid short-circuits between adjacent terminals. When a short-circuit occurs between terminals, the control circuit can no longer function normally, and therefore successfully detecting these types of short-circuits between adjacent terminals makes it possible to stabilize the operation of the control circuit. Patent Document 1, for example, describes one such technology for detecting short-circuits between adjacent terminals.

RELATED ART DOCUMENTS

Patent Documents

Patent Document 1: Japanese Patent Application Laid-Open Publication No. 2001-66340

SUMMARY OF THE INVENTION

In the technology disclosed in Patent Document 1, a short-circuit detection circuit includes a 2-input exclusive-OR gate and a D flip-flop. This short-circuit detection circuit detects short-circuits between terminals on the basis of whether the data detected between adjacent terminals remains the same for a prescribed number of clock cycles. However, in this short-circuit detection circuit, testing data must be input from external in order to detect short-circuits, and the type of data that can be handled is limited to digital data.

The present invention was made in light of the foregoing and aims to make it possible to detect short-circuits between adjacent terminals that handle analog signals in a control circuit for a switching power supply without having to input testing data from external.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a control circuit for a switching power supply that generates a prescribed output by switching a power semiconductor switching device ON and OFF, the control circuit including: a first external terminal that receives a signal representing an output voltage of the switching power supply; an error amplifier that compares the signal input to the first external terminal to a reference value and outputs, from an output terminal thereof, an error signal corresponding to a difference between the signal from the first external terminal and the reference value; a second external terminal internally connected to the output terminal of the error amplifier, the second external terminal being for connecting to an externally provided phase compensation circuit; a driver unit that receives the error signal outputted from the error amplifier and generates driving pulses to be applied to the power semiconductor switching device so as to turn the power semiconductor switching device ON and OFF on the basis of the error signal; a short-circuit detection circuit that determines whether a short-circuit occurs between the first external terminal and the second external terminal; a holding circuit that holds the error signal; and a switching circuit, wherein when the short-circuit detection circuit determines that the short-circuit occurs, the switching circuit provides an error signal held by the holding circuit prior to the detection of the short-circuit to the driver unit instead of the error signal outputted from the error amplifier so that the driver unit does not generate the driving pluses based on the error signal outputted from the error amplifier when the short-circuit is determined to have occurred.

Due to using the configuration described above, in the switching power supply control circuit according to this aspect of the present invention, the short-circuit detection circuit detects the short-circuit state between the first external terminal and the second external terminal, and the error signal held by the holding circuit from prior to detection of the short-circuit state is input to the driver unit instead of the error signal from the error amplifier. This makes it possible to input the error signal immediately prior to the short-circuit state to the driver unit instead of the output from the error amplifier in the short-circuit state, and therefore the output of the error amplifier which is output while in the short-circuit state is not input to the driver unit. Therefore, it is possible to avoid problematic situations in which the output of the switching power supply increases continuously due to a short-circuit between terminals.

In another aspect, the present disclosure provides a control circuit for a switching power supply, wherein the control circuit is constituted by an integrated circuit and includes a short-circuit detection circuit that detects short-circuits between a first terminal and a second terminal which are adjacent to each other, wherein the short-circuit detection circuit includes a first subtractor circuit that subtracts a voltage of the second terminal from the voltage of the first terminal and a second subtractor circuit that subtracts the voltage of the first terminal from the voltage of the second terminal, and wherein when a state in which an output of the first subtractor circuit and an output of the second subtractor circuit are both less than or equal to a prescribed value persists for longer than a prescribed period of time, the short-circuit detection circuit determines that the first terminal and the second terminal have short-circuited permanently, and causes the control circuit to stop driving the switching power supply.

Due to using the configuration described above, in this other aspect of the present invention, even when the voltages of the first terminal and the second terminal become substantially equal due to some incidental condition while the switching power supply is otherwise operating normally, it is not immediately determined that a short-circuit has occurred, and a permanent short-circuit is determined to have occurred only when this state persists for longer than a prescribed period of time. This makes it possible to prevent the operation of the switching power supply from being stopped immediately under such incidental conditions.

The present invention makes it possible to detect short-circuits between adjacent terminals that handle analog signals in a control circuit for a switching power supply without having to input testing data from external.

It is to be understood that both the foregoing general description and the following detailed description are exemplary and explanatory, and are intended to provide further explanation of the invention as claimed.

DETAILED DESCRIPTION OF EMBODIMENTS

Next, a switching power supply control circuit according to an embodiment of the present invention will be described in detail with reference to figures. Note that in the figures, the same reference characters are used for components that are the same or similar, and redundant descriptions of the details of such components will be omitted here.

(Overall Configuration)

Figure 1:
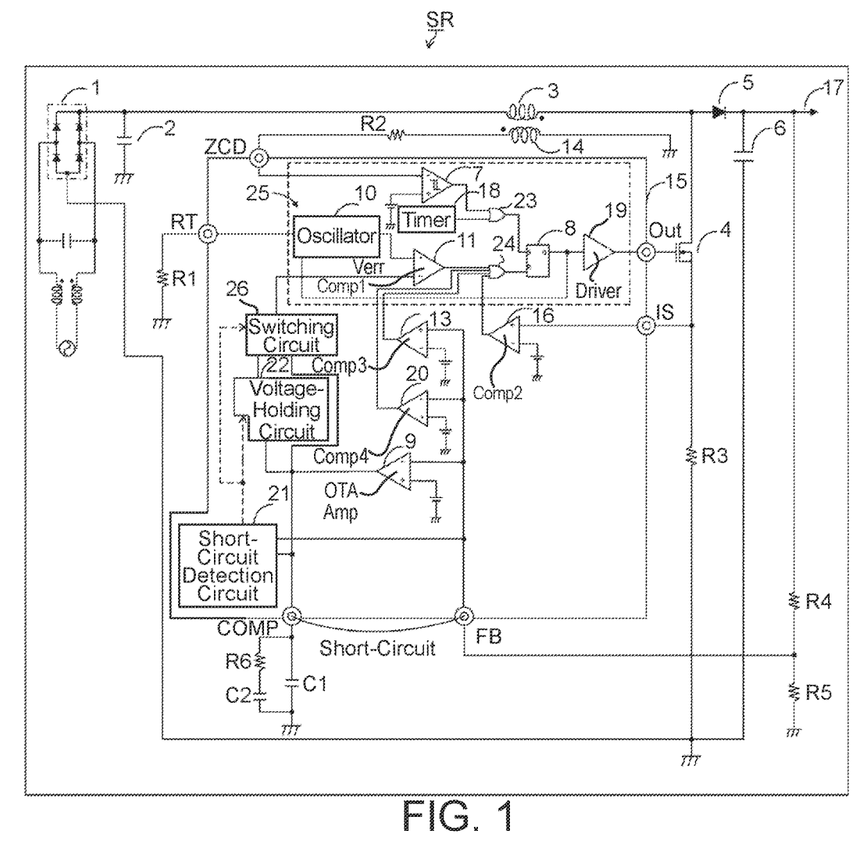
FIG. 1 is a circuit diagram illustrating the configuration of a switching power supply control circuit according to one embodiment of the present invention.

FIG. 1 illustrates an example of the configuration of a switching power supply control circuit according to one embodiment of the present invention and the configuration of a switching power supply to which that control circuit is applied. One characterizing feature of this embodiment of the present invention is the inclusion of a short-circuit detection circuit 21 and a voltage-holding circuit 22, for example, which will be described in detail later. First, the overall configuration will be described.

As illustrated in FIG. 1, a switching power supply SR is a step-up switching power supply, for example, and includes a full-wave rectifier 1, a capacitor 2, an inductor 3, an auxiliary inductor 14 which is magnetically coupled to the inductor 3 and used to detect instances of zero current in the inductor 3, a power semiconductor switching device 4, a diode 5, a capacitor 6, resistors R1 to R6, capacitors C1 and C2, and a control circuit 15. The control circuit 15 includes a zero-current detection comparator 7, an RS flip-flop 8, an error amp 9, an oscillator 10, a PWM comparator 11, an overvoltage detection comparator 13, an overcurrent detection comparator 16, a restart timer 18, a driver 19, an output decrease detection comparator 20, the short-circuit detection circuit 21, the voltage-holding circuit 22, a 2-input OR gate 23, and a 4-input OR gate 24. Moreover, the inductor 3, the power semiconductor switching device 4, the diode 5, and the capacitor 6 form a step-up circuit which steps up the voltage of the capacitor 2. This step-up operation is well-known and will not be described here.

Furthermore, as terminals for achieving various types of functionality, the switching power supply SR includes an output terminal 17, and the control circuit 15 includes a zero-cross terminal ZCD, a gate-driving output terminal OUT, a current detection terminal IS, a feedback input terminal FB (hereinafter, also referred to as a "feedback terminal FB"), a differential amplifier output terminal COMP (hereinafter, also referred to as a "phase compensation element connection terminal COMP") and a timing resistor connection terminal RT. The control circuit 15 further includes a power supply terminal, a ground terminal, and the like, although these are not explicitly illustrated in the figure. Next, each of these components will be described in more detail.

The full-wave rectifier 1 includes four rectifying diodes, for example. Input terminals are connected to an external AC power supply, and an output terminal is connected to one end of the capacitor 2 and one end of the inductor 3. The full-wave rectifier 1 further includes a grounded terminal (output terminal). The full-wave rectifier 1 rectifies AC voltage from the external AC power supply and outputs a DC voltage. Alternatively, the other end of the capacitor 2 is grounded, and the capacitor 2 smooths the rectified voltage output from the full-wave rectifier 1.

The other end of the inductor 3 is connected to the anode of the diode 5 and to the drain of the power semiconductor switching device 4. One end of the auxiliary inductor 14 is connected to the zero-cross terminal ZCD via the resistor R2, and the other end is grounded. The auxiliary inductor 14 functions as a zero-current detection element for the inductor 3. In other words, in states in which the inductor 3 is passing current towards the capacitor 6 side via the diode 5, the voltage difference between the voltage of the capacitor 6 and the voltage of the capacitor 2 is applied to the inductor 3, and a voltage proportional to this voltage difference is induced across the terminals of the auxiliary inductor 14. In this state, the inductor 3 discharges stored energy towards the output side, and the current flowing through the inductor 3 continuously decreases. Then, when the current flowing through the inductor 3 becomes equal to zero, the diode 5 becomes reverse-biased and the terminal voltage of the inductor 3 takes a value of zero, which causes the terminal voltage of the auxiliary inductor 14 to also take a value of zero. In other words, the instant at which the terminal voltage of the auxiliary inductor 14 changes from a non-zero value (which is substantially constant for the duration of each switching cycle) to zero is the instant at which the current flowing through the inductor 3 becomes equal to zero. The zero-current detection comparator 7 is a comparator which detects this change in the terminal voltage of the auxiliary inductor 14.

In the switching power supply SR of the present embodiment, the power semiconductor switching device 4 (described next) is switched ON when the current flowing through the inductor 3 becomes equal to zero, which improves the power factor of the switching power supply SR and thereby reduces high-frequency noise generated by the switching power supply SR.

The power semiconductor switching device 4 is constituted by an N-channel power MOSFET, for example, and switches ON and OFF in accordance with a voltage signal applied to the gate thereof (hereinafter, also referred to as a "gate-driving signal"). In the present embodiment, when a high-level (hereinafter, "H-level") signal from the RS flip-flop 8 (described later) is input to the gate via the driver 19, the power semiconductor switching device 4 switches ON. Moreover, when a low-level (hereinafter, "L-level") signal from the RS flip-flop 8 is input to the gate via the driver 19, the power semiconductor switching device 4 switches OFF.

In the diode 5, the anode is connected to the inductor 3 and is also connected to the drain of the power semiconductor switching device 4, and the cathode is connected to one end of the capacitor 6 and to the output terminal 17. As described above, in the embodiment as configured here, when the power semiconductor switching device 4 is OFF, the diode 5 discharges energy stored in the inductor 3 towards the capacitor 6 side, thereby resulting in supply of a stepped-up voltage to the output terminal 17.

The capacitor 6 is an output capacitor. The other end of the capacitor 6 is grounded, and the capacitor 6 removes high-frequency components resulting from the switching operation of the power semiconductor switching device 4 in order to supply a smoothed voltage. As described above, the capacitor 6, the inductor 3, the power semiconductor switching device 4, and the diode 5 form a step-up circuit. This step-up circuit supplies a DC output voltage of approximately 400 V, for example, to a load (not illustrated in the figure) which is connected between the output terminal 17 and ground. The magnitude of the stepped-up output voltage value is set using feedback control.

In the zero-current detection comparator 7, the inverting input terminal and the non-inverting input terminal are respectively connected to the zero-cross terminal ZCD and a comparison reference voltage source, and the output terminal is connected to the set terminal of the RS flip-flop 8 via the OR gate 23. As described above, the zero-current detection comparator 7 detects, via the zero-cross terminal ZCD, the resistor R2, and the auxiliary inductor 14, the timing at which the current flowing through the inductor 3 in the step-up circuit becomes equal to zero. Upon detecting that the current flowing through the inductor 3 has become equal to zero, the zero-current detection comparator 7 inputs an H-level signal (a set signal for the RS flip-flop 8) to the set terminal S of the RS flip-flop 8 via the OR gate 23 along with the output of the restart timer 18.

The reset terminal R of the RS flip-flop 8 is connected to the output terminal of the PWM comparator 11 via the OR gate 24. Moreover, the output terminal Q of the RS flip-flop 8 is connected to an input terminal of the driver 19 and to one input terminal of the oscillator 10. When the signal input to the set terminal S is at the H level and the signal input to the reset terminal R is at the L level, the RS flip-flop 8 is set and inputs an H-level gate-driving signal to the driver 19 and the oscillator 10. Moreover, when the signal input to the set terminal S is at the L level and the signal input to the reset terminal R is at the H level, the RS flip-flop 8 is reset and outputs an L-level gate-driving signal.

In the error amp 9, the non-inverting input terminal is connected to a reference voltage source, and the inverting input terminal is connected to the feedback terminal FB. Moreover, the output terminal of the error amp 9 is connected to the differential amplifier output terminal COMP, the short-circuit detection circuit 21, the voltage-holding circuit 22, and a switching circuit 26. The output of the switching circuit 26 is connected to the inverting input terminal of the PWM comparator 11. The error amp 9 amplifies the difference between the voltage value of a feedback signal (described later) and the voltage value of the reference voltage source to produce an error signal, and inputs this error signal to the short-circuit detection circuit 21, the voltage-holding circuit 22, and the switching circuit 26. The connection relationship between the error amp 9 and the PWM comparator 11 via the short-circuit detection circuit 21, the voltage-holding circuit 22, and the switching circuit 26 will be described in more detail later.

In the oscillator 10, the other input terminal is connected to the resistor R1 via the timing resistor connection terminal RT, and the output terminal is connected to the non-inverting input of the PWM comparator 11. The oscillator 10 generates a sawtooth wave used by the PWM comparator 11 to implement PWM control. In the present embodiment, the oscillator 10 is triggered by input of an H-level signal from the RS flip-flop 8 and begins generating the sawtooth wave when the power semiconductor switching device 4 switches ON.

Meanwhile, when the input signal from the RS flip-flop 8 is at the L level, the oscillator 10 stops generating the sawtooth wave, returns the oscillating sawtooth wave output to an initial value, and then waits for the next trigger (that is, for an H-level signal to be input).

The output terminal of the PWM comparator 11 is connected to the reset terminal R of the RS flip-flop 8 via the OR gate 24. The PWM comparator 11 compares the error signal output from the error amp 9 or the voltage-holding circuit 22 to the sawtooth wave signal output from the oscillator 10 and, when the signal level of the error signal is greater than the signal level of the sawtooth wave signal, outputs an L-level signal. Meanwhile, when the signal level of the sawtooth wave signal reaches the signal level of the error signal, the PWM comparator 11 inputs an H-level signal (a reset signal for the RS flip-flop 8) to the reset terminal R of the RS flip-flop 8 via the OR gate 24. As a result, the RS flip-flop 8 inputs an L-level signal to the driver 19.

The zero-current detection comparator 7, the RS flip-flop 8, the oscillator 10, the PWM comparator 11, the restart timer 18, the driver 19, and the OR gates 23 and 24 form a driver unit 25 which generates pulses for switching the power semiconductor switching device 4 ON and OFF on the basis of the error signal.

In the overvoltage detection comparator 13, the inverting input terminal is connected to a comparison reference power supply, and the non-inverting input terminal is connected to the feedback terminal FB. Moreover, the output terminal of the overvoltage detection comparator 13 is connected to the reset terminal of the RS flip-flop 8 via the OR gate 24. The overvoltage detection comparator 13 detects via the feedback terminal FB whether the stepped-up output voltage has become excessively high.

In the overcurrent detection comparator 16, the inverting input terminal is connected to a comparison reference power supply, and the non-inverting input terminal is connected to the current detection terminal IS. Moreover, the output terminal of the overcurrent detection comparator 16 is connected to the reset terminal of the RS flip-flop 8 via the OR gate 24. The overcurrent detection comparator 16 detects via the current detection terminal IS whether the current flowing through the power semiconductor switching device 4 has become excessively high.

In the driver 19, the output terminal is connected to the gate of the power semiconductor switching device 4 via the gate-driving output terminal OUT, and the driver 19 inputs a gate-driving signal for controlling the ON/OFF switching of the power semiconductor switching device 4.

In the output decrease detection comparator 20, the non-inverting input terminal is connected to a comparison reference voltage source, and the inverting input terminal is connected to the feedback terminal FB. The output decrease detection comparator 20 detects for short-circuits between the output terminal 17 of the switching power supply SR and ground on the basis of whether the output voltage value of the switching power supply SR is less than a desired voltage value. In other words, even when the switching operation of the power semiconductor switching device 4 has stopped and the step-up operation is not being performed, the capacitor 6 is charged by the output voltage of the full-wave rectifier 1 via the inductor 3 and the diode; thus, the voltage of the feedback terminal FB normally never becomes less than the voltage of the comparison reference voltage source. If the voltage of the feedback terminal FB does become less than the voltage of the comparison reference voltage source, this means that the output terminal 17 of the switching power supply SR has short-circuited to the ground, and therefore the switching operation of the switching power supply SR is stopped.

The short-circuit detection circuit 21 detects for short-circuits between the feedback terminal FB and the phase compensation element connection terminal COMP and has two input terminals which are respectively connected to the feedback terminal FB and the phase compensation element connection terminal COMP. Note that the feedback terminal FB and the phase compensation element connection terminal COMP are connected to the input and output of the same error amp 9 and are therefore normally adjacent to one another. The present embodiment is particularly focused on detecting short-circuits between the feedback terminal FB and the phase compensation element connection terminal COMP which are adjacent to each other. Furthermore, the output terminal of the short-circuit detection circuit 21 is connected to the voltage-holding circuit 22 and the switching circuit 26. The configuration of the short-circuit detection circuit 21 will be described in more detail later.

The voltage-holding circuit 22 is a circuit which, when a short-circuit is detected between the feedback terminal FB and the phase compensation element connection terminal COMP, switches the signal input to the inverting input terminal of the PWM comparator 11 from the error signal from the error amp 9 to a voltage signal held within the circuit itself. The voltage-holding circuit 22 has two input terminals which are respectively connected to the short-circuit detection circuit 21 and the phase compensation element connection terminal COMP. Moreover, the output terminal of the voltage-holding circuit 22 is connected to the switching circuit 26. The configuration of the voltage-holding circuit 22 will also be described in more detail later.

Next, the resistors R1 to R6 and the capacitors C1 and C2 will be described.

In the resistor R1, one end is connected to the timing resistor connection terminal RT, and the other end is grounded. The slope of the sawtooth wave generated by the oscillator 10 depends on the resistance of this resistor R1.

In the resistor R2, one end is connected to the auxiliary inductor 14, and the other end is connected to the zero-cross terminal ZCD. The voltage induced in the auxiliary inductor 14 by the current flowing through the inductor 3 is applied to the zero-cross terminal ZCD via this resistor R2.

In the resistor R3, one end is connected to the source of the power semiconductor switching device 4, and the other end is grounded. The resistor R3 detects the current flowing from the source of the power semiconductor switching device 4 to the ground, and this resistor converts the current flowing through itself to a voltage to produce a current detection signal.

The resistors R4 and R5 are connected in series with one another to detect the magnitude of the output voltage. The node between the resistors R4 and R5 is connected to the feedback terminal FB.

In the resistor R6, one end is connected to the phase compensation element connection terminal COMP, and the other end is connected to one end of the capacitor C2. The series circuit formed by the resistor R6 and the capacitor C2 is connected in parallel to the capacitor C1. In the capacitor C1, one end is connected to the phase compensation element connection terminal COMP, and the other end is grounded.

Next, each of the terminals will be described.

The output terminal 17 of the switching power supply SR is grounded via the series-connected resistors R4 and R5 and supplies a DC voltage to the load (not illustrated in the figure) which is connected between this output terminal 17 and ground.

The zero-cross terminal ZCD of the control circuit 15 is connected to the auxiliary inductor 14 via the resistor R2, as described above. Moreover, the zero-cross terminal ZCD is also connected to the inverting input terminal of the zero-current detection comparator 7 and is used to input the voltage change that occurs when the current flowing through the inductor 3 becomes equal to zero to the zero-current detection comparator 7 via the auxiliary inductor 14.

The gate-driving output terminal OUT is connected to the gate of the power semiconductor switching device 4 and is used to input the gate-driving signal for switching this power semiconductor switching device 4 ON and OFF from the driver 19 to the gate of the power semiconductor switching device 4.

The current detection terminal IS is connected to the source of the power semiconductor switching device 4 and to the non-inverting input terminal of the overcurrent detection comparator 16 and is used to detect the current flowing through the power semiconductor switching device 4. This terminal is used to supply a signal representing the current flowing through the power semiconductor switching device 4 to the overcurrent detection comparator 16 to allow the overcurrent detection comparator 16 to detect overcurrent.

The feedback terminal FB is used to feed back a voltage obtained by using the resistors R4 and R5 to resistively divide the voltage output from the output terminal 17 into the components described above in order to implement feedback control in the switching power supply SR.

The phase compensation element connection terminal COMP is used to connect the elements (the resistor R6 and the capacitors C1 and C2) for adjusting the phase of output of the error amp 9. Although in the present embodiment an operational transconductance amplifier (OTA; an amplifier which outputs current in accordance with the voltage difference between the two inputs) is used for the error amp 9, an op-amp (or an op-amp circuit) may be used instead of an OTA. In this case, different types of phase-adjusting elements need to be connected to the phase compensation element connection terminal COMP, but the operation of the switching power supply and the control circuit remains the same.

The timing resistor connection terminal RT is used to connect the external resistor R1 which determines the slope of the sawtooth wave generated by the oscillation of the oscillator 10.

In the present embodiment, the control circuit 15 is constituted by a semiconductor integrated circuit (IC) which integrates various types of features.

In the switching power supply SR configured as described above, when the magnitude of the load (not illustrated in the figure) connected between the output terminal 17 and the ground is constant, the magnitude of the abovementioned error signal is also constant. In this case, the ON period of the power semiconductor switching device 4 (that is, the width of the pulses for switching the power semiconductor switching device 4) corresponds to the period of time from when the sawtooth form of the sawtooth wave generated by the oscillator 10 starts rising from a base value until when it reaches the level of the abovementioned error signal. Therefore, the ON period of the power semiconductor switching device 4 can be controlled to remain constant.

Meanwhile, the switching power supply SR described above takes an AC voltage as input, and therefore the terminal voltage of the inductor 3 changes in accordance with the phase angle of that AC voltage. As a result, the slope of the current flowing through the inductor 3 changes in accordance with the input voltage. Thus, the switching power supply SR switches ON the power semiconductor switching device 4 when the current flowing through the inductor 3 becomes equal to 0 in order to bring the peak values of the input current (that is, the current at turn-off of the power semiconductor switching device 4) and the average value of the input current over each switching cycle into phase with the input AC voltage, thereby improving the power factor.

(Details of Short-Circuit Detection Circuit and Voltage-Holding Circuit)

Figure 2:
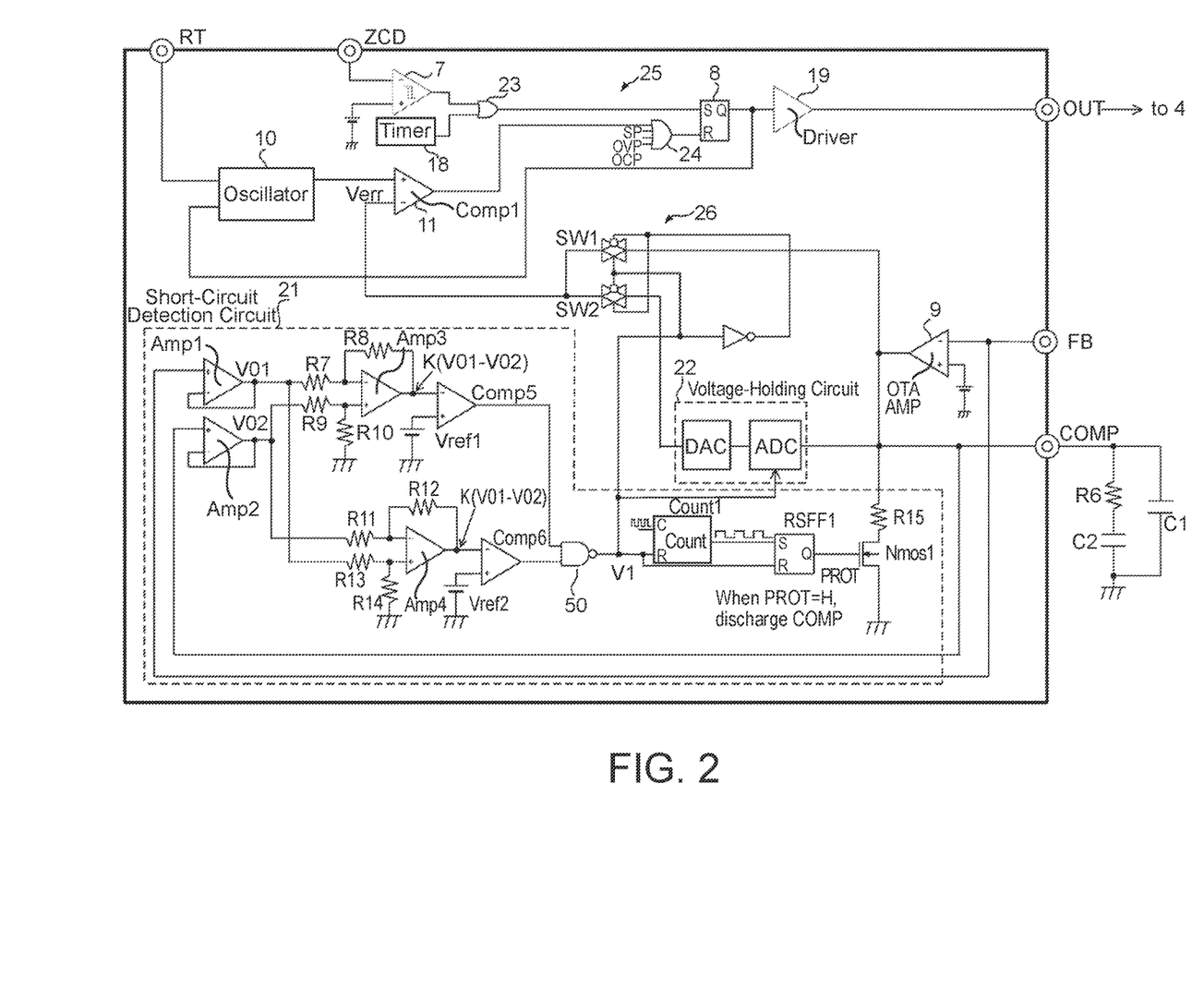
FIG. 2 is a circuit diagram illustrating the details of the short-circuit detection circuit and voltage-holding circuit illustrated in FIG. 1.

Next, the short-circuit detection circuit 21, the voltage-holding circuit 22, and the like will be described in more detail.

As illustrated in FIG. 2, the short-circuit detection circuit 21 includes op-amps Amp1, Amp2, Amp3, and Amp4; comparators Comp5 and Comp6; a NAND gate 50; a counter Count1, an RS flip-flop RSFF1, a semiconductor switch Nmos1, resistors R7 to R15; a reference voltage source Vref1; and a reference voltage source Vref2.

Moreover, the voltage-holding circuit 22 includes a DAC circuit and an ADC circuit, for example.

The voltage-holding circuit 22 holds the voltage of the phase compensation element connection terminal COMP from just before a short-circuit is detected between the feedback terminal FB and the phase compensation element connection terminal COMP (that is, from before a signal V1 from the NAND gate 50 (described later) takes the L level). The voltage-holding circuit 22 is configured such that when this L-level signal from the NAND gate 50 (described later) is input to a control input terminal CTL of the ADC circuit, the ADC circuit stops any AD conversion currently being performed and then, rather than performing any subsequent conversion, continuously outputs the last conversion result (digital data).

The outputs of the error amp 9 and the voltage-holding circuit 22 are respectively connected to the inverting input terminal of the PWM comparator 11 via the switching circuit 26, which is constituted by switches SW1 and SW2.

The switches SW1 and SW2 are respectively constituted by CMOS switches (transmission gates) in which an N-channel MOSFET and a P-channel MOSFET are connected in parallel to one another, for example. The switch SW1 is connected between the error amp 9 and the PWM comparator 11 and takes a non-conducting state when the output signal of the NAND gate 50 is at the L level. Meanwhile, the switch SW2 is connected between the voltage-holding circuit 22 and the PWM comparator 11 and takes a conducting state when the output signal of the NAND gate 50 is at the L level. In other words, when the output signal of the NAND gate 50 is at the L level, the output of the voltage-holding circuit 22 is input to the PWM comparator 11.

Conversely, when the output signal of the NAND gate 50 is at the H level, the switch SW1 takes a conducting state and the SW2 takes a non-conducting state, and the output of the error amp 9 is input to the PWM comparator 11.

The op-amp Amp1 is configured to be a voltage follower. Therefore, the output terminal and the inverting input terminal of the op-amp Amp1 are connected together directly, and the non-inverting input terminal is connected to the feedback terminal FB. Moreover, the output terminal of the op-amp Amp1 is connected via the resistor R7 to the inverting input terminal of the op-amp Amp3 and is also connected via the resistor R13 to the non-inverting input terminal of the op-amp Amp4.

Similar to the op-amp Amp1, the op-amp Amp2 is configured to be a voltage follower. Therefore, the output terminal and the inverting input terminal of the op-amp Amp2 are connected together directly, and the non-inverting input terminal is connected to the phase compensation element connection terminal COMP. Moreover, the output terminal of the op-amp Amp2 is connected via the resistor R9 to the non-inverting input terminal of the op-amp Amp3 and is also connected via the resistor R11 to the inverting input terminal of the op-amp Amp4.

In the op-amp Amp3, the inverting input terminal and the output terminal are connected together via the resistor R8, and the output terminal is connected to the inverting input terminal of the comparator Comp5. Moreover, the non-inverting input terminal of the op-amp Amp3 is grounded via the resistor R10. The op-amp Amp3 thus forms a subtractor circuit. The gain of this subtractor circuit is set as appropriate by the resistance values of the resistors R7 to R10. Note that subtractor circuits of this configuration are well-known, and therefore a detailed description will be omitted here.

In the op-amp Amp4, the inverting input terminal and the output terminal are connected together via the resistor R12, and the output terminal is connected to the inverting input terminal of the comparator Comp6. Moreover, the non-inverting input terminal of the op-amp Amp4 is grounded via the resistor R14. The op-amp Amp4 thus forms a subtractor circuit. The gain of this subtractor circuit is set as appropriate by the resistance values of the resistors R11 to R14.

In the comparator Comp5, the non-inverting input terminal is connected to the reference voltage source Vref1, and the output terminal is connected to one input terminal of the NAND gate 50. Moreover, the other terminal of the reference voltage source Vref1 is grounded. The voltage value of this reference voltage source Vref1 is set as appropriate in accordance with the gain of the subtractor circuit formed by the op-amp Amp3.

In the comparator Comp6, the non-inverting input terminal is connected to the reference voltage source Vref2, and the output terminal is connected to the other input terminal of the NAND gate 50. Moreover, the other terminal of the reference voltage source Vref2 is grounded. The voltage value of this reference voltage source Vref2 is set as appropriate in accordance with the gain of the subtractor circuit formed by the op-amp Amp4. If a threshold voltage for detecting short-circuits between the feedback terminal and the phase compensation element connection terminal COMP is set to ±10 mV or less and the gains of the subtractor circuit formed by the op-amp Amp3 and the subtractor circuit formed by the op-amp Amp4 are set to 100, for example, it is preferable that the voltage values of the reference voltage sources Vref1 and Vref2 be set to 1 V.

In the NAND gate 50, the output terminal is connected to the reset terminal R of the counter Count1, to the reset terminal R of the RS flip-flop RSFF1, and to the analog-todigital conversion circuit in the voltage-holding circuit 22. Furthermore, the output terminal of the NAND gate 50 is connected to the other MOSFET of the switch SW1 and to one MOSFET of the switch SW2 and is also connected via an inverter (a NOT gate) to one MOSFET of the switch SW1 and to the other MOSFET of the switch SW2.

The counter Count1 is constituted by a plurality of stages of D flip-flops connected together in series, for example, and a clock signal of a prescribed frequency is input to a clock terminal C. The output terminal is connected to the set terminal S of the RS flip-flop RSFF1.

The output terminal Q of the RS flip-flop RSFF1 is connected to the gate of the switch Nmos1, and the RS flip-flop RSFF1 inputs a protection signal to this gate.

Furthermore, the switch Nmos1 is constituted by an N-channel MOSFET, for example, and switches ON and OFF in accordance with the signal level of the protection signal supplied to the gate. The drain of the switch Nmos1 is connected via the resistor R15 to the phase compensation element connection terminal COMP, and the source is grounded.

In the analog-to-digital circuit in the voltage-holding circuit 22, the input terminal is connected to the phase compensation element connection terminal COMP, the control input terminal CTL is connected to the output terminal of the NAND gate 50, and the output terminal is connected to the digital-to-analog circuit. Moreover, the output terminal of the digital-to-analog circuit is connected to the inverting input terminal of the PWM comparator 11 via the switch SW2.

(Operation of Short-Circuit Detection Circuit and Voltage-Holding Circuit)

Next, the operation of the short-circuit detection circuit 21 and the voltage-holding circuit 22 configured as described above will be described in detail. Note that to facilitate understanding, the following description utilizes an example in which the voltages of the feedback terminal FB and the phase compensation element connection terminal COMP are respectively referred to as a voltage V01 and a voltage V02, and it is determined that a short-circuit may have occurred between these terminals when the difference between V01 and V02 is less than ±10 mV.

The voltage V01 of the feedback terminal FB and the voltage V02 of the phase compensation element connection terminal COMP are respectively applied to the op-amp Amp1 and the op-amp Amp2. The op-amps Amp1 and Amp2 respectively function as voltage followers and impedance-convert and output the voltage V01 and the voltage V02 as they are. Passing these voltages through the voltage follower circuits makes it possible to reduce the effects of the impedance of the feedback terminal FB and the phase compensation element connection terminal COMP.

The output of the op-amp Amp1 is input via the resistor R7 to the inverting input terminal of the op-amp Amp3 and is also input via the resistor R13 to the non-inverting input terminal of the op-amp Amp4. Moreover, the output of the op-amp Amp2 is input via the resistor R9 to the non-inverting input terminal of the op-amp Amp3 and is also input via the resistor R11 to the inverting input terminal of the op-amp Amp4.

The op-amp Amp3 forms a subtractor circuit which amplifies the difference between the voltage V01 passed through the op-amp Amp1 and the voltage V02 passed through the op-amp Amp2 and inputs the resulting amplified voltage signal to the inverting input terminal of the comparator Comp5. Let the output of the subtractor circuit be K(V02−V01). Here, K is a positive constant representing the gain of the subtractor circuit and is determined by the resistance values of the resistors R7 to R10. Moreover, the op-amp Amp4 forms a subtractor circuit which amplifies the difference between the voltage V01 passed through the op-amp Amp1 and the voltage V02 passed through the op-amp Amp2 and inputs the resulting amplified voltage signal to the inverting input terminal of the comparator Comp6. Let the output of the subtractor circuit be K(V01−V02). Here, K is a positive constant representing the gain of the subtractor circuit and is determined by the resistance values of the resistors R11 to R14. In the present embodiment, the resistance values of the resistors R7 to R14 are set such that the gain of the subtractor circuit formed by the op-amp Amp3 and the gain of the subtractor circuit formed by the op-amp Amp4 are equal.

The comparator Comp5 compares the voltage from the output terminal of the op-amp Amp3 to the voltage of the reference voltage source Vref1. When the voltage from this output terminal is less than the voltage of the reference voltage source Vref1, the comparator Comp5 outputs an H-level signal, and when the voltage from this output terminal is greater than the voltage of the reference voltage source Vref1, the comparator Comp5 outputs an L-level signal.

Here, the comparator Comp5 determines whether the difference between the voltage V01 and the voltage V02 is less than 10 mV when the voltage V01 is less than the voltage V02. Note that when the voltage V01 is greater than the voltage V02, K(V02−V01) is negative, and therefore the comparator Comp5 outputs an H-level signal.

The comparator Comp6 compares the voltage from the output terminal of the op-amp Amp4 to the voltage of the reference voltage source Vref2. When the voltage from this output terminal is less than the voltage of the reference voltage source Vref2, the comparator Comp6 outputs an H-level signal, and when the voltage from this output terminal is greater than the voltage of the reference voltage source Vref2, the comparator Comp6 outputs an L-level signal.

Here, opposite to the comparator Comp5, the comparator Comp6 determines whether the difference between the voltage V01 and the voltage V02 is less than 10 mV when the voltage V01 is greater than the voltage V02. Note that when the voltage V01 is less than the voltage V02, K(V01−V02) is negative, and therefore the comparator Comp6 outputs an H-level signal.

The NAND gate 50 outputs an L-level signal V1 when the input signal from the comparator Comp5 is at the H level and the input signal from the comparator Comp6 is at the H level and outputs an H-level signal V1 in all other cases. In other words, when the difference between the voltage V01 and the voltage V02 is greater than or equal to 10 mV, the output of one of the comparators Comp5 and Comp6 is at the L level, and therefore the output of the NAND gate 50 is at the H level. Thus, the NAND gate 50 inputs the L-level signal V1 to the control input terminal CTL of the voltage-holding circuit 22, the reset terminal R of the counter Count1, and the switches SW1 and SW2 only when the voltage difference between the feedback terminal FB and the phase compensation element connection terminal COMP is less than 10 mV.

Therefore, when the signal V1 from the NAND gate 50 is at the L level, the switch SW1 takes the non-conducting state and the switch SW2 takes the conducting state. As a result, the error signal from the error amp 9 stops being input to the PWM comparator 11, and the voltage value signal held by the voltage-holding circuit 22 is input to the PWM comparator 11 instead. In other words, the signal which is fed back into the PWM comparator 11 switches from being the error signal from the error amp 9 to being the voltage value signal held by the voltage-holding circuit 22.

Meanwhile, when the signal V1 from the NAND gate 50 is at the H level, the switch SW1 takes the conducting state and the switch SW2 takes the non-conducting state. As a result, the voltage value signal output by the voltage-holding circuit 22 stops being input to the PWM comparator 11, and the error signal from the error amp 9 is input to the PWM comparator 11 instead (normal operation).

Moreover, when the signal V1 from the NAND gate 50 is at the L level, an L-level signal is input to the reset terminal R of the counter Count1, thereby removing the reset on the counter Count1 and allowing the counter Count1 to begin a counting operation. Once the signal V1 from the NAND gate 50 remains at the L level for a prescribed counting period Delay1, the output of the counter Count1 sets the RS flip-flop RSFF1, which causes the protection signal PROT input from the RS flip-flop RSFF1 to the gate of the semiconductor switch Nmos1 to take the H level (see the protection signal in FIG. 3). As a result, the operation mode of the short-circuit detection circuit 21 transitions to a protection mode in which the semiconductor switch Nmos1 switches ON (see "Nmos1 ON" in FIG. 3) and the output terminal of the error amp 9 is grounded via the resistor R15 and the semiconductor switch Nmos1.

Figure 3:
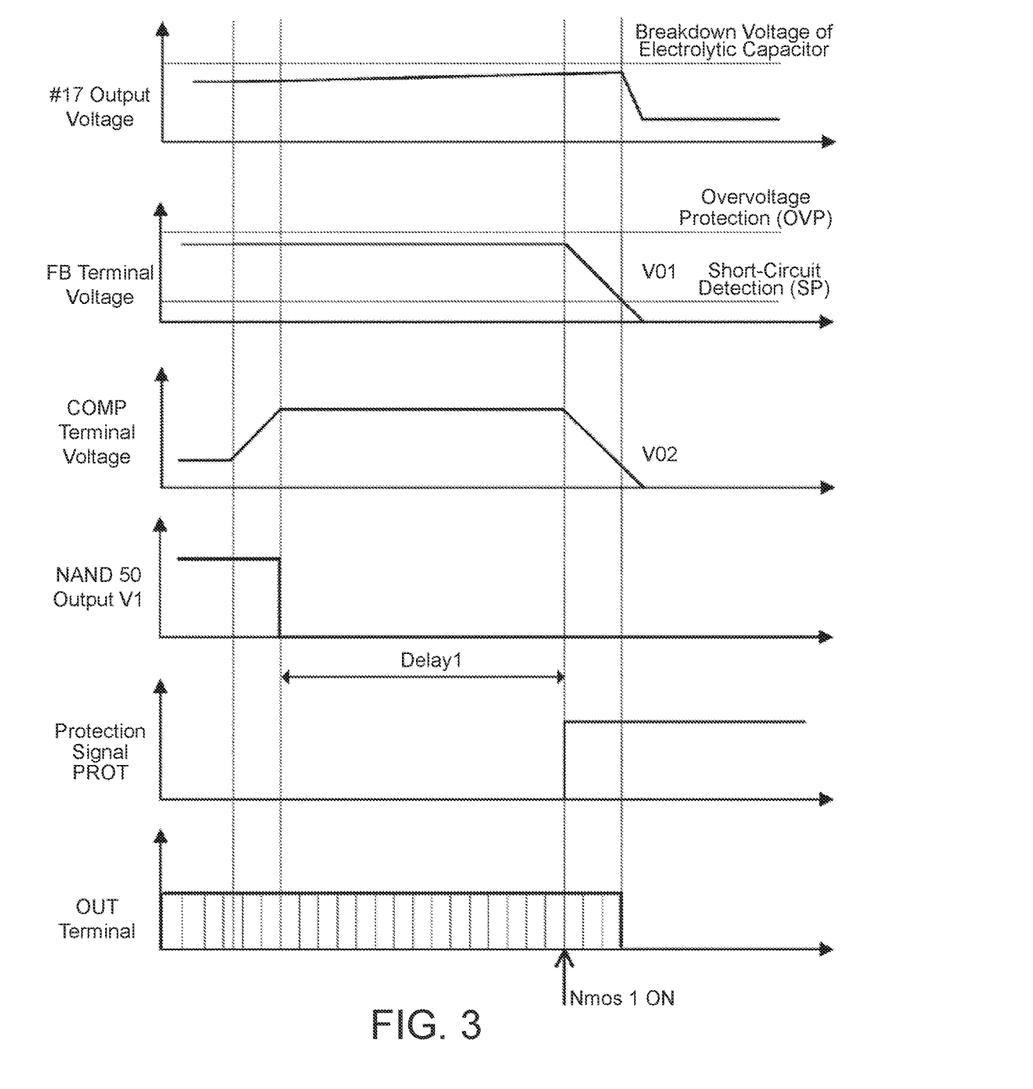
FIG. 3 is a waveform diagram illustrating examples of operation waveforms in a short-circuit detection operation.

Due to the semiconductor switch Nmos1 entering the conducting state, any charge stored in the capacitors C1 and C2 connected to the phase compensation element connection terminal COMP gets pulled out of these capacitors, and the voltage V02 of the phase compensation element connection terminal COMP takes a value of 0 V (see V02 in FIG. 3).

Furthermore, when a short-circuit occurs between the feedback terminal FB and the phase compensation element connection terminal COMP, the voltage V01 of the feedback terminal FB also takes a value of 0 V, and the resulting operation of the output decrease detection comparator 20 described above causes the switching operation of the switching power supply SR to stop.

Next, the operation in a non-short-circuited state in which the feedback terminal FB and the phase compensation element connection terminal COMP are not short-circuited will be described. Even when these terminals are in the non-short-circuited state, there are cases in which the voltage difference between the voltage V01 and the voltage V02 of these terminals can become less than 10 mV (hereinafter, such states will be referred to as "small voltage difference state"). Therefore, the present embodiment is configured such that even when a small voltage difference state occurs while in the non-short-circuited state, as long as the duration of that small voltage difference state remains short, the power semiconductor switching device 4 continues its switching operation. This is because while in the non-short-circuited state, such small voltage difference state only lasts for a short period of time. More specifically, the embodiment is configured such that the semiconductor switch Nmos1 is switched ON to transition to protection mode only when a small voltage difference state continues for the prescribed period Delay1, and such that when the small voltage difference state lasts for less than the period Delay1, the semiconductor switch Nmos1 is not switched ON.

Furthermore, when the feedback terminal FB and the phase compensation element connection terminal COMP are in a short-circuited state, the error amp 9 stops functioning normally and the output of the amp can no longer be used for control purposes. Due to the presence of the phase compensation elements, the output of the error amp 9 does not instantly change significantly; however, as time elapses the output takes a value which is increasingly different from the value that it is supposed to take absent the short-circuit. Using this signal as is would cause the switching power supply SR to malfunction and could potentially cause various types of damage. In the present embodiment, the last normal output of the error amp 9 continues to be used until switching is stopped as described above, thereby making it possible to prevent such malfunctions.

In addition, when a small voltage difference state occurs while in the non-short-circuited state, the signal V1 from the NAND gate 50 takes the L level, the voltage-holding circuit 22 stores the immediately prior output of the error amp 9, and then the voltage held by the voltage-holding circuit 22 is input to the PWM comparator 11 via the switch SW2. Moreover, when a small voltage difference state occurs, the counter Count1 begins counting, and if the prescribed period Delay1 elapses while still in this state, the semiconductor switch Nmos1 is switched ON. However, in the non-short-circuited state, a small voltage difference state ends before this period Delay1 elapses, and therefore the output of the NAND gate 50 returns to the H level and resets the counter Count1, which prevents the semiconductor switch Nmos1 from being switched ON.

Therefore, while in the non-short-circuited state, even if a small voltage difference state of a duration less than the period Delay1 occurs, the overall switching power supply SR continues its normal switching operation.

(Operation and Effects)

As described above, the present embodiment makes it possible to detect short-circuits between the feedback terminal FB (which is the input terminal of the error amp 9) and the phase compensation element connection terminal COMP (which is the output terminal of the error amp 9). If operation were to be continued as is even after such a short-circuit occurred, the abnormal output of the error amp 9 would cause the output voltage of the switching power supply SR to continuously increase, which could potentially destroy the capacitor 6 or damage the load. The present embodiment makes it possible to stop the switching operation of the power semiconductor switching device 4, thereby preventing the output voltage from damaging the load or exceeding the breakdown voltage of the capacitor 6 and destroying the capacitor 6.

Moreover, in the present embodiment, even when the voltage V01 of the feedback terminal FB and the voltage V02 of the phase compensation element connection terminal COMP are substantially equal, the phase compensation element connection terminal COMP is grounded via the resistor R15 and the semiconductor switch Nmos1 if this state persists for the prescribed counting period Delay1. In other words, in the present embodiment, when the voltage V01 and the voltage V02 are substantially equal, first, the possibility of a short-circuit (hereinafter, a "short-circuit state") between these terminals is detected, and then, if this state persists for a prescribed period of time, a permanent short-circuit state is detected. This makes it possible to filter out cases in which the voltages of these terminals enter a small voltage difference state due to some incidental reason, thereby making it possible to more reliably detect actual short-circuits between adjacent terminals.

An embodiment of the present invention was described above. However, the present invention is not limited to the embodiment described above, and various applications and modifications are possible without departing from the technical scope of the present invention. Embodiments in which such applications or modifications are made are also included within the technical scope of the present invention as defined in the claims and their equivalents.

For example, although in the embodiment above a step-up switching power supply SR was described as an example, the present invention is not limited to this configuration. The present invention can also be applied to a step-down switching power supply. In this case, the voltage of the output terminal 17 can be decreased to 0 V.

Moreover, the voltage-holding circuit 22 described above may be a standard sample and hold circuit configured including a capacitor, for example.

Furthermore, although in the embodiment above the power semiconductor switching device 4 was described as being a MOSFET, the present invention is not limited to this configuration. For example, the power semiconductor switching device 4 may be an insulated-gate bipolar transistor (IGBT).

The present invention is well-suited to use in a control circuit which improves the power factor of a switching power supply.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A control circuit for a switching power supply that generates a prescribed output by switching a power semiconductor switching device ON and OFF, the control circuit comprising:
   a first external terminal that receives a signal representing an output voltage of the switching power supply;
   an error amplifier that compares the signal input to the first external terminal to a reference value and outputs, from an output terminal thereof, an error signal corresponding to a difference between the signal from the first external terminal and the reference value;
   a second external terminal internally connected to the output terminal of the error amplifier, the second external terminal being for connecting to an externally provided phase compensation circuit;
   a driver unit that receives the error signal outputted from the error amplifier and generates driving pulses to be applied to the power semiconductor switching device so as to turn the power semiconductor switching device ON and OFF on a basis of the error signal;
   a short-circuit detection circuit that determines whether a short-circuit occurs between the first external terminal and the second external terminal;
   a holding circuit that holds the error signal; and
   a switching circuit,
   wherein when the short-circuit detection circuit determines that the short-circuit occurs, the switching circuit provides an error signal held by the holding circuit before the short-circuit detection circuit determined that the short-circuit occurred to the driver unit instead of the error signal outputted from the error amplifier so that the driver unit does not generate the driving pluses based on the error signal outputted from the error amplifier when the short-circuit is determined to have occurred.

2. The control circuit according to claim 1, wherein the short-circuit detection circuit determines that the short-circuit has occurred when a voltage value detected at the first external terminal and a voltage value detected at the second external terminal are substantially equal.

3. The control circuit according to claim 1, wherein the short-circuit detection circuit forcefully grounds the second external terminal when the short-circuit detection circuit continues to determine that the short-circuit has occurred for a prescribed period of time.

4. The control circuit according to claim 3, wherein the short-circuit detection circuit includes a semiconductor switch that is arranged between the second external terminal and a ground and that is turned ON upon a protection signal being input to a gate thereof when the short-circuit detection circuit continues to determine that the short-circuit has occurred for a prescribed period of time.

5. The control circuit according to claim 1,
   wherein the driver unit includes a PWM comparator, and
   wherein when the short-circuit is not determined to have occurred, the PWM comparator generates the driving pulses by comparing a prescribed sawtooth wave signal with the error signal currently outputted from the error amplifier, and when the short-circuit is determined to have occurred, the PWM comparator generates the driving pulses by comparing the prescribed sawtooth wave signal with the error signal held by the holding circuit prior to the detection of the short-circuit.

6. The control circuit according to claim 5, wherein the holding circuit includes an analog-to-digital conversion circuit that analog-to-digital converts an input voltage value and stores resulting digital data, and a digital-to-analog conversion circuit that digital-to-analog converts the digital data input from the analog-to-digital conversion circuit and outputs a conversion result to the PWM comparator.

7. The control circuit according to claim 1, wherein the control circuit is integrated on a single semiconductor chip.

8. The control circuit according to claim 7, wherein the first external terminal and the second external terminal are adjacent to each other.

9. A control circuit for a switching power supply,
   wherein the control circuit is constituted by an integrated circuit and includes a short-circuit detection circuit that detects short-circuits between a first terminal and a second terminal which are adjacent to each other,
   wherein the short-circuit detection circuit includes a first subtractor circuit that subtracts a voltage of the second terminal from a voltage of the first terminal and a second subtractor circuit that subtracts the voltage of the first terminal from the voltage of the second terminal, and
   wherein when a state in which an output of the first subtractor circuit and an output of the second subtractor circuit are both less than or equal to a prescribed value persists for longer than a prescribed period of time, the short-circuit detection circuit determines that the first terminal and the second terminal have short-circuited permanently, and causes the control circuit to stop driving the switching power supply.

* * * * *